United States Patent [19]
Kuznicki et al.

[11] Patent Number: 5,948,383
[45] Date of Patent: Sep. 7, 1999

[54] HYBRID ZEOLITE-SILICA COMPOSITIONS

[75] Inventors: Steven M. Kuznicki, Whitehouse Station; Tadeusz W. Langner, Maplewood; Jacqueline S. Curran, Cranford; Valerie A. Bell, Edison, all of N.J.

[73] Assignee: Engelhard Corporation, Iselin, N.J.

[21] Appl. No.: 09/030,418

[22] Filed: Feb. 25, 1998

Related U.S. Application Data

[63] Continuation-in-part of application No. 08/891,039, Jul. 10, 1997, abandoned, which is a continuation-in-part of application No. 08/824,597, Mar. 26, 1997, abandoned.

[51] Int. Cl.$^6$ .......................... C01B 39/22; C01B 39/14; C01B 39/18
[52] U.S. Cl. .......................... 423/700; 423/710; 423/712; 423/DIG. 21; 423/DIG. 24; 210/687; 252/179; 502/63; 502/79
[58] Field of Search .................... 423/700, 712, 423/710, DIG. 21, DIG. 24; 210/687; 252/179; 502/63, 79

[56] References Cited

U.S. PATENT DOCUMENTS

| | | |
|---|---|---|
| 3,014,836 | 12/1961 | Proctor, Jr. . |
| 3,112,176 | 11/1963 | Haden, Jr. . |
| 3,586,523 | 6/1971 | Fanselow et al. . |
| 4,138,363 | 2/1979 | Hertzenberg et al. . |
| 4,216,125 | 8/1980 | Campbell et al. . |
| 4,243,545 | 1/1981 | Campbell et al. . |
| 4,454,056 | 6/1984 | Kittelmann et al. . |
| 4,605,509 | 8/1986 | Corkill et al. . |
| 4,663,071 | 5/1987 | Bush et al. . |
| 4,683,334 | 7/1987 | Bergna et al. . |
| 4,830,999 | 5/1989 | Drago et al. .................. 502/74 |
| 5,500,199 | 3/1996 | Bellussi et al. ............ 423/328.2 |
| 5,512,266 | 4/1996 | Brown et al. . |
| 5,571,768 | 11/1996 | Chang et al. .................. 502/64 |

FOREIGN PATENT DOCUMENTS

| | | |
|---|---|---|
| 0 565 364 | 10/1993 | European Pat. Off. . |
| 1 213 628 | 4/1960 | France . |
| 1 554 062 | 1/1969 | France . |
| 28 49 898 | 5/1980 | Germany . |
| 1473201 | 5/1977 | United Kingdom . |
| WO 95/21125 | 8/1995 | WIPO . |

OTHER PUBLICATIONS

H. van Bekkum, et al., "Introduction to Zeolite Science and Practice" Elsevier Science Publishers, (vol. 58) 1991 pp. 94–97. (No Month).

Carr, S.W., Gore, B. and Anderson, M.W., Chem Mater. 1997, vol. 9, pp. 1927–1932. (No Month).

High Resolution Solid State NMR of Silicates and Zeolites, G. Engelhardt and D.Michel, John Wiley & Sons, Chichester, 1987 pp. 221. (No Month).

*Primary Examiner*—Mark L. Bell
*Assistant Examiner*—David Sample

[57] ABSTRACT

This invention relates to zeolitic molecular sieve compositions characterized by outstanding capability to complex multivalent cations, especially calcium. In particular, the invention relates to novel zeolitic molecular sieve compositions, especially those based on molecular sieves having a high alumina-to-silica ratio, in which crystals of the zeolite are modified by the inclusion of occluded silicate.

13 Claims, 3 Drawing Sheets

A) Dried zeolite P is tetragonal which shifts both peaks downfield.
B) Wet zeolite P is pseudocubic which shifts both peaks upfield.

A) Dried zeolite P is tetragonal which shifts both peaks downfield.

B) Wet zeolite P is pseudocubic which shifts both peaks upfield.

FIG.3

A) Gismondine, COH (Example 2)
B) HZSC (Example 3)
C) HZSC (Example 10)
D) Zeolite A

HYBRID ZEOLITE-SILICA COMPOSITIONS

CROSS REFERENCE TO RELATED APPLICATIONS

This application is a continuation in part of Ser. No. 08/891,039, filed Jul. 10, 1997, now abandoned, which in turn is a continuation-in-part of Ser. No. 08/824,597, filed Mar. 26, 1997, now abandoned.

BACKGROUND OF THE INVENTION

This invention relates to zeolitic molecular sieve compositions characterized by outstanding capability to complex multivalent cations, especially calcium. In particular, the invention relates to novel zeolitic molecular sieve compositions, especially those based on molecular sieves having a high aluminum content, in which crystals of the zeolite are modified by the inclusion of occluded silica within the crystals.

With environmental concerns over phosphates rising during the last generation, zeolite molecular sieves have taken a dominant role as the water softening builder component of most detergents. Environmentally "friendly", zeolites have been a poor substitute for phosphates from a performance standpoint, having both lower calcium and magnesium sequestration capacities as well as much lower rates of sequestration. The sequestration properties of zeolites arise from their ability to ion-exchange. This ion-exchange ability derives from tetrahedral Al(III) inherent in classical zeolite frameworks. Each aluminum induces one negative charge on the framework which is counterbalanced by an exchangeable cationic charge. Thus, exchange capacity is limited by the aluminum content and "detergent" zeolites have been restricted to the relatively short list of "high aluminum" zeolites. By Lowenstein's Rule, the Si/Al ratio of a zeolite may not be lower than 1.0 and concomitantly, the aluminum content may not exceed 7.0 meq per gram for an anhydrous material in the sodium form. This capacity may alternatively be expressed as 197 mg CaO per gram zeolite (anhydrous) when water softening is the desired exchange reaction. Zeolites demonstrating this maximum aluminum content include Zeolite A, high aluminum analogs of Zeolite X and high aluminum analogs of gismondine (often referred to as Zeolite B, P or MAP).

While Zeolite A has been the "detergent zeolite" of choice for years, the possibility of employing a high aluminum version of gismondine-type materials in calcium sequestration has been known for more than a generation (U.S. Pat. No. 3,112,176 Haden et al.) and has recently found renewed interest (for example, U.S. Pat. No. 5,512,266 Brown, et al.). In addition to zeolites, the ability of silicates to complex ions such as calcium and especially magnesium has long been known and sodium silicate has long been employed as a cheap, low performance detergent builder. More recently, complex silicates such as Hoechst SKS-6 have been developed which are claimed to be competitive with higher performance zeolites.

Figure 1:
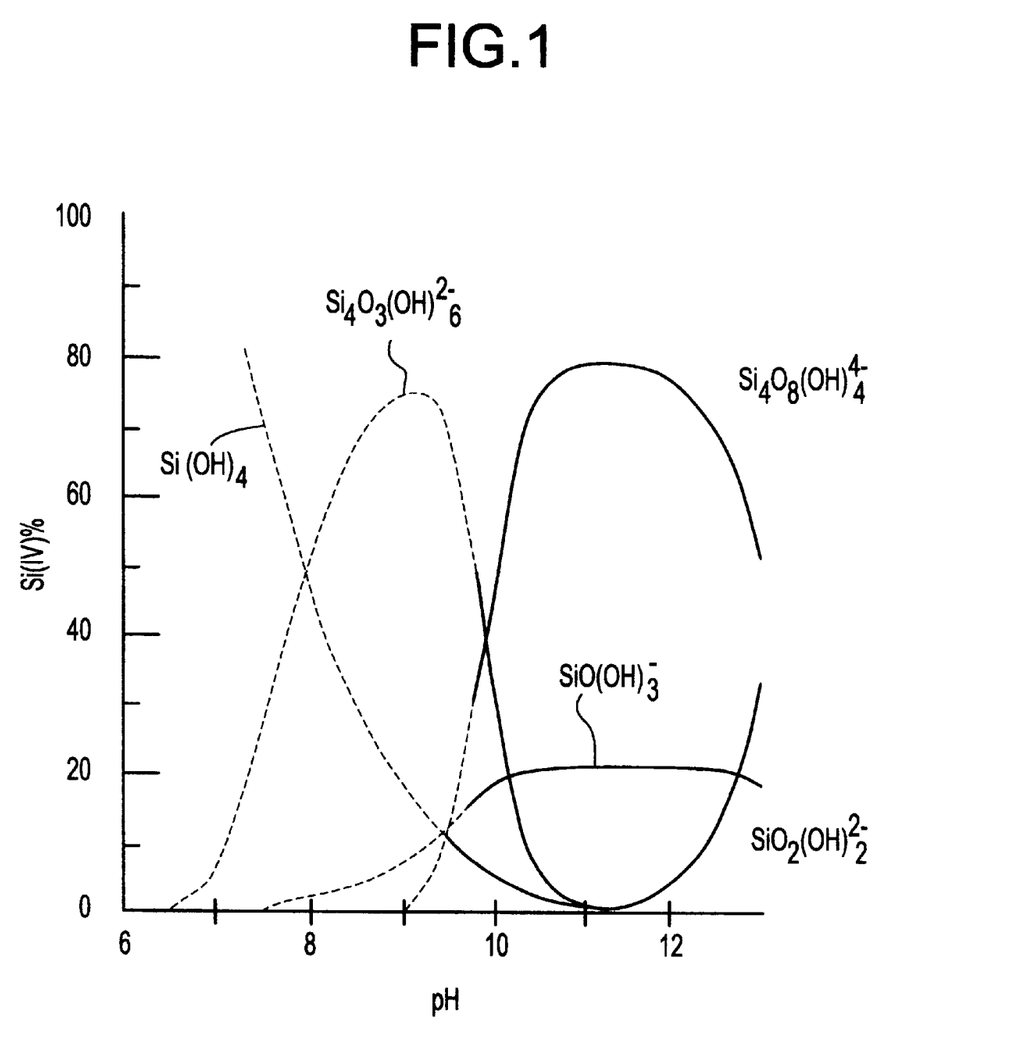
FIG. 1 is a graph correlating the concentration of silicate species versus pH for sodium silicate solutions. The figure is a copy of the figure appearing in H. Van Bekkum et al., "Introduction to Zeolite Science and Practice", Elsevier Science Publishers, 1991 (94).

The capacity for silicates to complex ions such as calcium and magnesium is inversely proportional to silicate chain length and directly proportional to the electronic charge on that chain fragment. Silicates depolymerize with increasing alkalinity (FIG. 1). At moderate pH (where wash cycles are conducted) silicates are polymeric. However, at much higher pH's silica not only become predominantly monomeric, but that monomer may possess multiple charges. If such small, highly charged fragments could be exposed to solutions bearing multivalent cations, very powerful high capacity sequestration agents would result. We believe that we have created such a situation by isolating and stabilizing substantial concentrations of such species within zeolite cages where ions such as calcium and magnesium are free to enter from an aqueous environment (such as wash water) and react with these powerful sequestration agents.

Detergent compositions based on zeolitic builders are described in U.S. Pat. No. 3,605,509 (Corkill et al.) and U.S. Pat. No. 4,663,071 (Bush et al.). The teachings of both patents are incorporated in full herein by cross-reference.

SUMMARY OF THE INVENTION

This invention relates to hybrid zeolite-silicate compositions which demonstrate unusual and beneficial properties in complexing multivalent cations. Such hybrid materials may be prepared by crystallizing high aluminum zeolites in highly alkaline/high silica environments. Chemical analysis indicates an excess of silica in these species beyond that inherent to their crystalline frameworks. Such materials demonstrate sequestration capacities for cations such as calcium which not only exceed the amount of zeolitic aluminum available for ion-exchange, but in fact, may exceed the theoretical limit possible for a zeolite. Thus, these materials and their properties must be considered something distinctly different than zeolitic. Such compositions show extreme promise as water softening agents and detergent builders and may find other applications in complexing multivalent cations such as in the removal of calcium from sugars and fatty oils or in removing heavy metal such as lead from various streams.

It is believed that the key mechanism in the effectiveness of these materials is derived from the ability of zeolite cages to isolate and stabilize much smaller, more highly charged silicate units than exist in normal aqueous solutions such as wash water. These silicate units are introduced during synthesis of said hybrid zeolite-silica compositions by providing an environment wherein silica in the reaction mixture is depolymerized to highly charged predominantly monomeric units before crystallization begins.

These occluded silicate units are readily visible in $^{29}$Si NMR spectra. Such units are much more powerful in complexing multivalent cations than existing silica compositions used for that purpose. The zeolite framework and occluded silicate units act in concert, as a new type of hybrid composition, showing properties neither zeolites, silicates nor physical blends of the two demonstrate. In addition to high capacity, these new hybrid compositions demonstrate unusually rapid rates of sequestration, a critical parameter in applications such as detergent building.

LIST OF FIGURES

FIG. 4 is a comparative XRD of (a) a commercial MAP known as ZEOCROS 180, (b) a commercial MAP known as DOUCIL A-24, (c) pure MAP with 1% added sodalite, (d) pure MAP.

FIG. 5 is a comparative $^{29}$Si NMR of (a) pure MAP, (b) HZSC of the present invention, (c) MAP plus 1% added hydroxysodalite, and (d) a commercial MAP known as ZEOCROS 180.

DETAILED DESCRIPTION OF INVENTION

Compositions of the invention had been prepared by reacting a finely divided aluminum source such as a dried aluminosilicate gel or powdered gibbsite and more preferably finely divided metakaolin with concentrated silicate solutions at pH values above 12 at temperatures ranging from about ambient to about 100° C. and at atmospheric pressure.

It is absolutely crucial for the preparation of the novel hybrid zeolite-silica compositions of this invention that the aluminum source must be added last to the reaction mixture. Thus, if all the ingredients of the reaction mixture are added together and heated to crystallization temperature, a conventional zeolite of the prior art will be formed. The novel hybrid materials of this invention will not be formed.

It is even more desirable to prepare the novel compositions of this invention by heating the reaction mixture at temperatures of from 50° C. to 85° C. before the addition of the aluminum source for a period of time of about 30 minutes or longer.

While not wishing to be bound by any theory of operation, nevertheless, it appears that heating the reaction mixture for about 30 minutes prior to aluminum addition allows the silicate to depolymerize and form the predominantly occluded silicate units previously discussed.

Compositions of the invention have been prepared by reacting finely divided metakaolin with concentrated sodium silicate solutions at pH values above 12 at temperatures ranging from about ambient to about 100° C. and at atmospheric pressure.

We prefer to use high purity metakaolins, especially those low in iron and titania, when color is a consideration. For example, metakaolin having an $Fe_2O_3$ content below 1%, preferably below 0.5% by weight and a $TiO_2$ content below 2% by weight preferably below 1% by weight are useful. The metakaolin should be in powder form. These powders may be prepared by removing grit and coarse impurities from kaolin ores, usually fractionating the degritted crude, drying the resulting slurry of fractionated hydrous kaolin, pulverizing the dried material, calcining in conventional manner to produce metakaolin (see, for example, U.S. Pat. No. 3,112,176 (Haden et al.)), and pulverizing the metakaolin by means of a hammer mill or the like. U.S. Pat. No. 3,014,836 Proctor et al. is cross-referenced herein for its disclosure of producing calcined kaolin pigments from an acidic (bleached) filter cake of kaolin by steps including drying, pulverizing, calcining and repulverizing; in practice of this invention the procedures of Proctor et al must be modified by using lower calcination temperature to produce the desired metakaolin form of calcined clay. The kaolin ore may be upgraded by means such as froth flotation, magnetic purification, selective flocculation, mechanical delamination, grinding or combinations thereof before drying, pulverization, calcination and repulverization. In many commercial operations, a chemically dispersed slip of the kaolin is dried in a spray dryer, forming microspheres. See, for example, U.S. Pat. No. 3,586,523 Fanselow et al. The resulting microspheres of hydrous (uncalcined) kaolin are then pulverized, calcined and repulverized, as taught in the patent of Fanselow et al.

The particle sizes of the hydrous kaolinite precursor of the metakaolin starting material affect the size of the HZSC product. Since HZSC products having a fine particle size are usually preferred, fine particle size metakaolins obtained from fine particle size hydrous kaolins are recommended. These particle sizes are most frequently measured by kaolin producers as values obtained by sedimentation, typically using a Sedigraph® 5100 analyzer (supplied by Micromeretics Corporation) and the values are reported as "equivalent spherical diameter" (e.s.d.). Use of other measuring instruments may give somewhat different values. In Example 3, illustrative of the process of the invention, typical samples of the hydrous kaolin precursor of the metakaolin are about 90% by weight finer than 1 micron, e.s.d., as measured using the Sedigraph® 5100 instrument. The high brightness hydrous kaolin used in this example was prepared from a coarse white Georgia kaolin crude using the steps of degritting, froth flotation to remove colored impurities, mechanical delamination and fractionation. The fractionated product, about 90% by weight finer than 1 micron e.s.d., was recovered as a dispersed fluid aqueous slip that was spray dried, pulverized, calcined to metakaolin condition and repulverized. The particle size of the repulverized metakaolin is invariably coarser than that of the hydrous kaolin.

HZSC compositions of the invention are prepared by synthesizing those zeolitic molecular sieves that have a high $Al_2O_3/SiO_2$ molar ratio, e.g., $SiO_2/Al_2O_3$ molar ratios of 3 or below, preferably in the range of 2 to 3 according to the teachings of the prior art with the crucial exception that the aluminum source is added last to the reaction mixture. Species include type P (also referred to as type B), zeolite A, faujasite type such as high alumina X types, chabazite analogs and mixtures therof.

After crystallization, the zeolite crystals are washed thoroughly with water, preferably deionized water, to remove sodium and spurious silica from the crystal surfaces. In some cases, some replacement of sodium by hydrogen may take place during washing. The crystals can be washed with solutions other than those of pure water.

About 5 to 40% by weight of the silica content of the washed crystals is due to the occluded silicate species, usually 5 to 20% by weight. Thus, the total $SiO_2$ analysis as determined by conventional chemical analytic means will exceed that of the $SiO_2$ that would be expected based on the framework silica content as indicated by x-ray powder patterns and $^{29}$Si NMR analysis of the HZSC composition. The occluded silicate portion of this silica is readily ascertained from the $^{29}$Si NMR peaks at about -81 to -85 ppm.

$^{29}$Si NMR has become a standard technique in the analysis of zeolites. The utility of this technique is based on the fact that different frequencies correspond to different electronic environments around the silicon, typically affected in zeolites by the chemistry of neighboring atoms and/or Si—O bond angles. It detects all silicon species present, not just those associated with long-range crystallinity. This makes it sensitive to species that may not be detected by XRD.

Preferably, the compositions of the HZSC mixture of zeolitic molecular sieve and occluded silicate may be represented by the molar formula:

$$1.25\pm0.20Na_2O:1.00Al_2O_3:xSiO_2:yH_2O$$

wherein x is 2.10 to 2.90 in the case of zeolite B;

x is 2.10 to 2.90 in the case of zeolite A;

x is 2.10 to 2.90 in the case of faujasite;

x is 2.10 to 2.90 in the case of chabazite; and y is 0–20.

The composition contains 5 to 40% by weight of the $SiO_2$ of x as non-zeolitic silicate detectable by $^{29}Si$ NMR, the occluded silicate being predominately within the crystals of said molecular sieve.

Hybrid zeolite-silica compositions were prepared and contrasted to high aluminum zeolite and silica standards.

EXAMPLE 1

High aluminum versions of gismondine, sometimes referred to as Zeolite MAP, are the newest manifestation of high aluminum zeolite detergent builders. In order to produce zeolite MAP, Example 2 of U.S. Pat. No. 5,512,266 was replicated by the following procedure:

A sodium aluminate solution (containing 20% $Al_2O_3$, 20% $Na_2O$ and 60% $H_2O$) was prepared by dissolving 32.2 grams of sodium aluminate and 10.1 grams of NaOH in 57.5 grams of deionized water. This solution was then combined with 26.4 grams of NaOH and 264.3 grams of deionized water and placed in a constant temperature bath at 95° C. A sodium silicate solution was prepared by dissolving 109.6 grams of N-Brand® sodium silicate (containing 29.0% $SiO_2$, 9% $Na_2O$ and 62% $H_2O$) with 2.8 grams NaOH and 264.3 grams deionized $H_2O$. This solution was also brought to 95° C. in the constant temperature bath. The silicate solution was slowly added to the aluminate solution and vigorously stirred. The resultant gel was crystallized at 95° C. for five hours, following which the resultant crystals were filtered and washed with two lots of 500-ml deionized water. The crystalline product was dried in a forced air oven at 100° C. overnight. The crystalline product was analyzed and found to have a gross chemical Si/Al molar ratio of approximately 1.13 ($SiO_2/Al_2O_3=2.26$). The characteristic XRD powder pattern was as described in U.S. Pat. No. 5,512,266. This material will hereafter be referred to as MAP.

EXAMPLE 2

High aluminum versions of gismondine have long been known to demonstrate high ion-exchange capacities. In order to prepare a high aluminum analog of this mineral, Example 1C of U.S. Pat. No. 3,112,176 was replicated by the following procedure:

10.0 grams of pulverized Metamax® metakaolin supplied by Engelhard Corporation was slurried in 100.0 grams of deionized water. To this slurry was added a solution of 10.6 grams of NaOH dissolved in 20.0 grams of deionized water. This mixture was crystallized at 102° C. in a stirred autoclave for 50 hours. The crystalline product of the reaction was filtered and washed with two 500-ml lots of deionized water. The crystalline product was dried in a forced air oven at 100° C. overnight. The crystalline product was analyzed and found to have a gross chemical Si/Al molar ratio approaching 1.00 ($SiO_2/Al_2O_3=2.00$). The characteristic XRD powder pattern was as described in U.S. Pat. No. 3,112,176 and was essentially indistinguishable from that described in U.S. Pat. No. 5,512,266. This material will hereafter be referred to as COH (Composition Of Haden).

EXAMPLE 3

In order to prepare a Hybrid Zeolite-Silica Composition, the following procedure was applied:

1000 grams of fine particle size metakaolin obtained by calcining an ultrafine mechanically delaminated ground hydrous kaolin (90% by weight finer than 1 micron, e.s.d.), followed by pulverization, as described above, was used. The powdered metakaolin was blended into an alkaline silicate solution containing 702 grams of N-Brand® sodium silicate solution and 1064 grams of NaOH in 4800 grams of deionized water which had been mixed and preheated to 72° C. The mixture was then reacted under vigorous stirring at 72° C. for eight hours at ambient pressure in an open stainless steel vessel. The crystalline product of the reaction was filtered and washed three times with 2000-ml lots of 72° C. deionized water. The crystalline product was dried in a forced air oven at 100° C. overnight. The crystalline product was analyzed and found to have a gross chemical Si/Al molar ratio of approximately 1.15 ($SiO_2/Al_2O_3=2.30$). An XRD powder pattern essentially identical to that of Example 1 and 2 (characteristic of gismondine-type zeolites) was obtained. This material will hereafter be referred to as an HZSC (Hybrid Zeolite-Silica Composition).

Additionally, the sodium content of this material as synthesized was found to be essentially equal to that of the silica (Na/Si=1.01), and to be substantially above the aluminum content on a molar basis (Na/Al=1.16). Generally, the aluminum content of a zeolite is expected to equal its cationic content in that each framework aluminum induces one net negative framework charge which is counterbalanced by cations in order to maintain electronic neutrality. This extra sodium is a characteristic of HZSC and is believed to be the result of sodium in association with the occluded silicate species.

The average particle size (50% by weight finer than) of the crystalline product was 5.5 microns as determined by a Sedigraph® 5100.

EXAMPLE 4

As a preliminary assessment of water softening ability, a "calcium binding test" as described by Henkel (GB 1 473 201) was conducted using the following procedure:

In a Waring® blender mixer containing 1 liter of an aqueous solution of 0.594 g of $CaCl_2$ (equivalent to 300 mg of CaO per liter) adjusted to pH 10 with dilute NaOH, 1.0 gram of the test sequestrant (air equilibrated) was added. The sample was vigorously stirred by setting the Waring® blender to low speed for 15 minutes. After this period, the aluminosilicate was filtered off and the residual hardness (x) in mg CaO/liter was determined using a calcium ion selective electrode. The calcium binding capacity was then calculated from the formula: Calcium binding capacity=300-x. The theoretical maximum binding capacity for a zeolite in this test is 197 mg CaO/g anhydrous zeolite. The results for the crystalline products of Examples 1, 2 and 3 in this test are listed below as Table 1.

TABLE 1

"Calcium Binding Capacities" of Test Sequestrants

| | | |
|---|---|---|
| Example 1 | MAP (as per Example 2 USP 5,512,266) | 163 mg CaO |
| Example 2 | COH (as per Example 1C USP 3,112,176) | 169 mg CaO |
| Example 3 | HZSC (as per this invention) | 197 mg CaO |

The binding capacity of MAP and COH were exactly what would be expected from data contained in Column 6, lines 21 through 24 of U.S. Pat. No. 5,512,266 for P-type zeolites with Si/Al molar ratios of 1.00 and 1.13 respectively. The COH calcium binding capacity is slightly higher than that of the MAP, probably because of its slightly greater aluminum content. The 197 mg reading for the HZSC is extremely unexpected in that this was a fully hydrated sample containing 10–15 weight % water and thus the anhydrous capacity would appear to exceed the theoretical limit for a zeolite. In order to establish its full sequestration capacity, an additional test was performed.

EXAMPLE 5

The full sequestration capacity of the crystalline product of Example 3 (HZSC) at pH 10 (typical of wash water) was established by exchanging 3.0 grams of the material twice with 6.0 grams of $CaCl_2 2H_2O$ dissolved in 400 ml deionized water. The exchanges were each conducted for approximately 45 minutes at a temperature of 100° C. The sample was filtered and washed six times with approximately 100 cc deionized water to remove any spurious $CaCl_2$. The sample was then dried at 100° C. for approximately 12 hours. The sample was then subjected to conventional X-ray fluorescence chemical analysis techniques. The analysis revealed 23.5 weight % CaO, 42.0 weight % $SiO_2$, 31.9 weight for % $Al_2O_3$ and approximately 1.0% other materials on a dry weight basis. Thus, the material contained 7.0 meq/g Si, 6.26 meq/g Al and 8.37 meq/g Ca. Not only does this indicate 34% more calcium than can be accounted for by exchange with the available aluminum, it is nearly 20% greater than the 7.0 meq capacity theoretically possible for ion-exchange into a maximum aluminum zeolite. In terms of mg CaO/g anhydrous zeolite (as in the Henkel test) this is a capacity of 236, well above the theoretical zeolite maximum of 197. Clearly, zeolite ion-exchange is not the only sequestration mechanism operating for the HZSC of Example 3.

EXAMPLE 6

Figure 2:
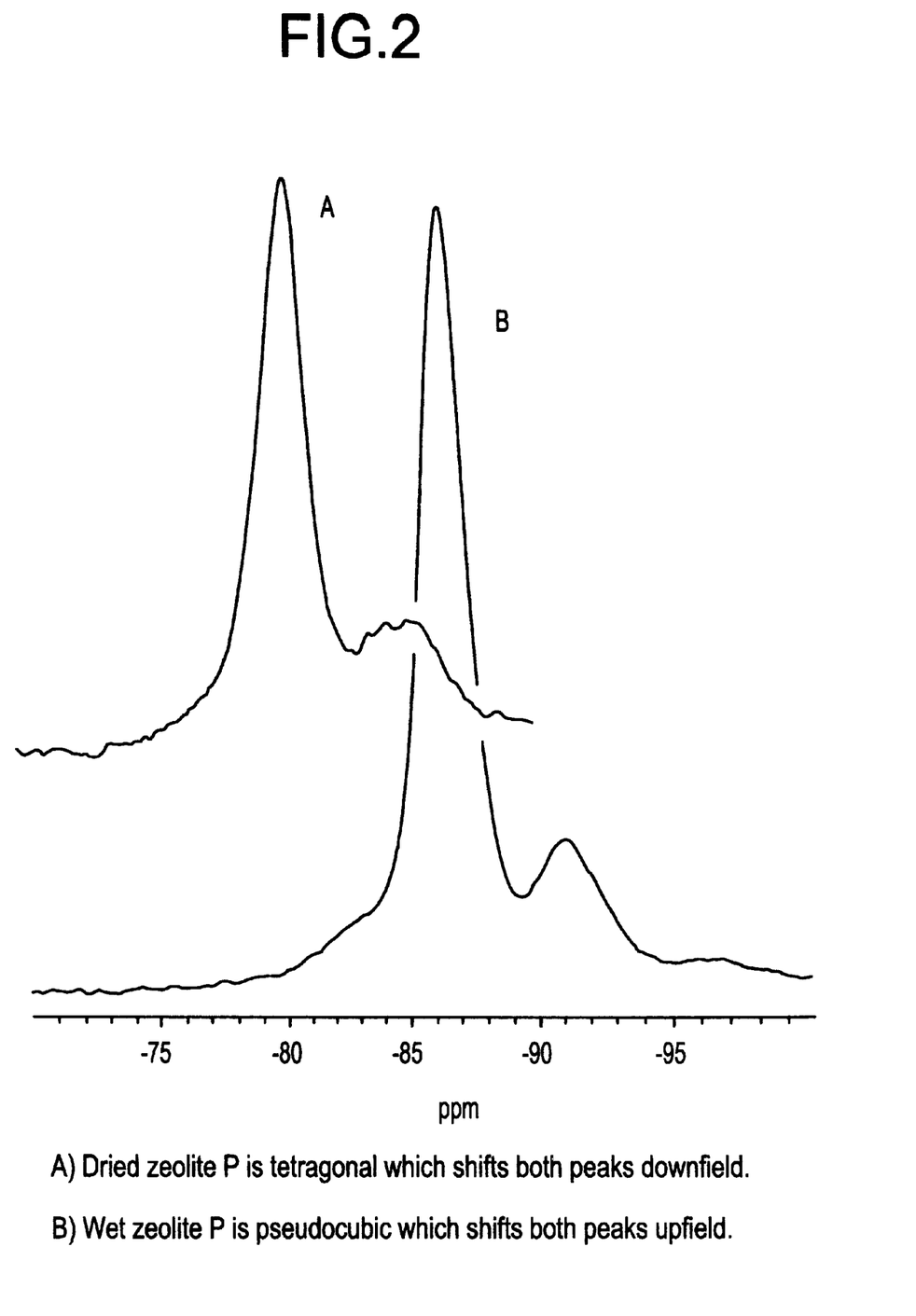
FIG. 2 contrasts $^{29}$Si NMR for "wet" and "dry" samples of a novel hybrid zeolite-silica composition of the invention as presented in Example 3. In this figure, the curve A is for "dried" zeolite and indicates the unit cell is tetragonal which shifts both peaks downfield. Curve B is for "wet" zeolite and shows the unit cell is pseudocubic which shifts both peaks upfield. The zeolite peak ratios stay constant during the shift. However, there is always extra intensity present at −81 to −85 ppm, indicating a nonzeolitic component at that frequency consisting of 10–15% of the total $^{29}$Si NMR signal.

Since calcium, silica and alumina were the only significant species present in the fully loaded sample of Example 5, and since the calcium content was much greater than could be accounted for by aluminum induced ion-exchange, the hypothesis was advanced that some of the silica was in an active form and had bound additional calcium. In order to assess if non-zeolitic silica were present, a sample of the air equilibrated HZSC of Example 3 was subjected to silicon NMR. A spectrum was obtained with two zeolitic peak s at −86.5 and −91.1 ppm respectively. The peak at −86.5 ppm had a clear shoulder at its front indicating an additional peak at −81 to −85 ppm (see FIG. 2). P-type zeolites are well known to reversibly distort from pseudocubic to tetragonal unit cell symmetry upon drying, typically near 100° C. When the HZSC was dehydrated and reexamined by silicon $^{29}Si$ NMR, the tetragonal unit cell material now showed its strongest peak downshifted to −79.7 ppm and a second very asymmetric peak at circa −81 to −85 ppm which appeared to be a composite of the secondary MAP zeolite peak downshifting and the unidentified peak previously seen at −81 to −85 ppm as a shoulder to the major zeolitic peak. Comparison of the relative intensities of the zeolitic peaks in wet and dry states indicates that this peak at −81 to −85 ppm, which does not shift with the zeolitic silica, accounts for approximately 10–15% of the total silicon of the sample. Comparison to the gross elemental analysis indicates that 1.0 to 1.5 calciums would therefore be complexed per additional silicon for an exchange at pH 10. In other words, each of the non-framework silicons bear two to three exchangeable charges per silicate unit. This indicates a predominantly occluded silicate species. Such occluded silicate species cannot exist in the relatively neutral water of a wash solution, but apparently can exist stably within zeolite cages.

EXAMPLE 7

In order to assess the relative performance of an HZSC versus zeolite as a water softening agent in mixtures resembling wash water, sequestration tests were conducted in mixed calcium/magnesium solutions at 35° C. and pH 10. 1.5 liter charges of 1.03 molar calcium plus magnesium solutions were buffered with glycine solutions to a pH of 10. The Ca:Mg molar ratio was established at 3:1. The test hardness solutions were heated to 35° C. in a constant temperature bath at which point 0.45 gram charges of air equilibrated test sequestrants were added and the test mixtures agitated by an overhead stirrer at a rate of 200 rpm. Total hardness concentration was monitored by an Orion Model 9332BN total hardness electrode connected to an Orion Model 720A pH meter. Both the "instantaneous" and "equilibrium" hardness removal of a sequestrant can be critical parameters depending upon the particular environment in which they are employed. Hardness removal at 15 seconds was taken as indicative of "instantaneous" hardness removal and readings at 15 minutes were taken as a measurement of "equilibrium" properties.

The MAP of Example 1, the COH of Example 2 and the HZSC of Example 3 were subjected to this test and the results are summarized as Table 2.

TABLE 2

Timed Hardness Removal by Test Sequestrants

| Sample | Hardness Removed 15 seconds | Hardness Removed 15 Minutes |
|---|---|---|
| MAP (Example 1) | 18% | 55% |
| COH (Example 2) | 6% | 48% |
| HZSC (Example 3) | 48% | 82% |

This test indicates that the MAP of Example 1 is "instantaneously" faster than the COH of Example 2, but reaches a relatively similar "equilibrium." The HZSC of Example 3 behaves qualitatively differently, being both much more rapid than either zeolite sample and equilibrating at a much greater depth of hardness removal.

EXAMPLE 8

In order to ascertain whether physical mixtures of zeolite and silicate sequestrants could account for the extraordinary performance of the Hybrid Zeolite-Silica Composition of Example 3, a 90%/10% mixture of the MAP of Example 1 and SKS-6 state-of-the-art silica-based water softener was made and subjected to the test of Example 7. The 15 second and 15 minute hardness removal readings were 17% and 58% respectively, only trivially differing from the MAP sequestration results and not showing anything remotely resembling the superior performance of the hybrid composition.

EXAMPLE 9

In order to ascertain if other zeolite frameworks could be utilized forming Hybrid Zeolite-Silica Compositions, additional synthesis experiments were conducted. Zeolite A was selected because it is the "standard" of the detergent zeolite industry. Zeolite A was synthesized from metakaolin by the following procedure:

75.0 grams of pulverized Metamax® metakaolin was slurried in 750.0 grams of deionized water. To this slurry was added an NaOH solution prepared by dissolving 26.4 grams of NaOH in 150.0 grams of deionized water. The reaction mixture was crystallized in a stirred autoclave at 102° C. for 50 hours. The product was filtered and washed two times with 1000-ml lots of deionized water. The sample was then dried overnight in a forced air oven at 100° C. The product of this example demonstrated a strong, clean XRD powder pattern characteristic of Zeolite A. This material was then subjected to the hardness sequestration test of Example 7 and the 15 second and 15 minute hardness removal readings were 10% and 41% respectively.

EXAMPLE 10

In order to synthesize a Hybrid Zeolite-Silica Composition with Zeolite A as the zeolite framework component, a new HZSC material was prepared by the following procedure:

An alkaline silicate solution was prepared by dissolving 175.0 grams of NaOH and 99.0 grams of N-Brand® sodium silicate in 522.8 grams deionized water. After mixing and preheating the mixture to 80° C., 109.5 grams Metamax® metakaolin was added and the mixture reacted by stirring for one hour at 80° C. in a constant temperature bath. The resultant product was filtered and washed three times with 1000-ml lots of deionized water. The sample was then dried overnight in a forced air oven at 100° C. The product of this example demonstrated a strong, clean XRD powder pattern characteristic of Zeolite A. This material was then subjected to the hardness sequestration test of Example 7 and the 15 second and 15 minute hardness removal readings were 43% and 51% respectively, showing that hardness sequestration was remarkably faster and substantially more thorough than that of the Zeolite A of the previous example. Clearly, these new hybrid compositions offer substantial advantages over comparable zeolites in both rate and amount of hardness removal.

EXAMPLE 11

Figure 3:
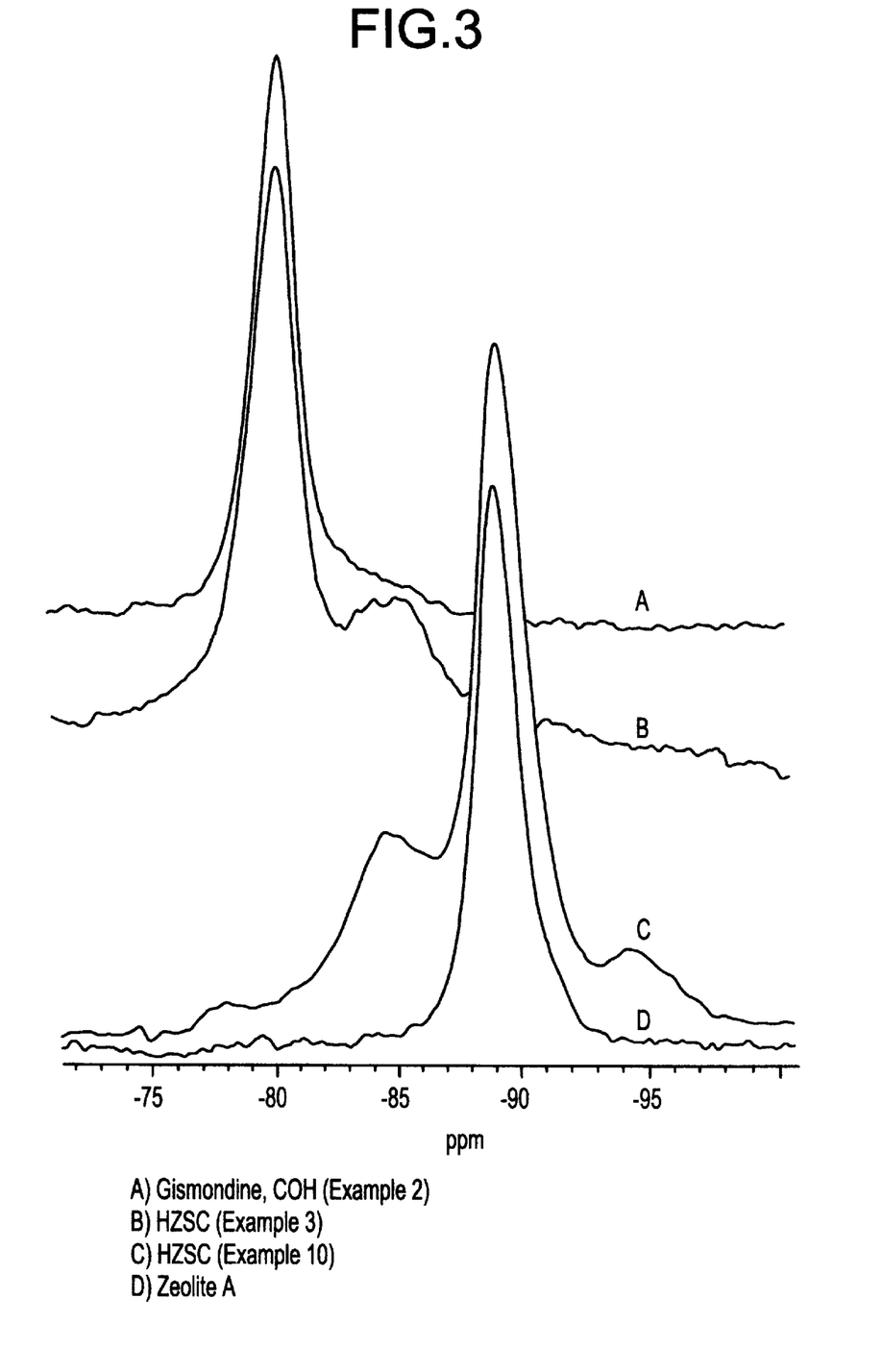
FIG. 3 presents comparative $^{29}$Si NMR tracings of various zeolites and hybrid zeolite/silica compositions (HZSC) of this invention. In this figure, A is the tracing of a gismondine type composition prepared in Example 2 and represents a prior art zeolite P prepared from metakaolin (COH). B&C are $^{29}$Si NMRs of the products of the invention (Examples 3 and 10, respectively). D is the $^{29}$Si NMR of zeolite A.

Zeolite A and the HZSC of Example 10 were subjected to $^{29}$Si NMR in order to assess the presence of occluded silicate species comparable to those of the HZSC of Example 3. Comparative NMR are presented as FIG. 3. Unlike gismondine-type materials, Zeolite A does not possess a peak in the region of –81 to –85 ppm and a comparison of Zeolite A to the HZSC of Example 10 clearly shows the occluded silicate species as is found in the HZSC of Example 3. The clear peak at –81 to –85 ppm represents approximately 40% of the silica of the base Zeolite A structure and in fact, may be so high that it limited the "equilibrium" sequestration capacity of the material of Example 10 by physically filling many of the cavities.

EXAMPLE 12 (COMPARATIVE)

In initial scale-up efforts to make substantial quantities of HZSC equivalent to that of Example 3, 74.97 pounds of deionized water was combined with 42.7 pounds of 50% NaOH solution, 14.12 pounds of N-Brand Sodium silicate and 20.0 pounds of Luminex® brand metakaolin and the resultant mixture was stirred and brought from ambient temperature to 72 degrees C. in a 25-gallon stainless steel reactor. The mixture was crystallized under vigorous agitation for 8 hours at 72 degrees C. and was subsequently washed and filtered on several large pan filters including multiple reslurries and rinses with substantial excesses of deionized water.

The powder XRD pattern for the product of this example was that of a highly crystalline material of gismondine-type structure, consistent with that of Example 3. However, the silicon NMR lacked the shoulder on the main –86.5 ppm peak which is indicative of the peak at –81 to –85 ppm associated with the non-crystalline occluded silicate of HZSC. Noting this lack of occluded silicate necessary to yield the enhanced calcium capacity noted for HZSC, an exhaustive calcium exchange was conducted in accordance with the procedure of Example 5. Analysis of the exhaustively exchanged sample yielded 18.5% CaO, 45.1% $SiO_2$ and 34.0% $Al_2O_3$ on a dry weight basis. Thus, the material contained approximately 7.50 meq/g Si, 6.67 meq/g Al and 6.60 meq/g Ca. The Ca/Al meq/g ratio approaching 1.0 is consistent with a high degree of exchange onto the aluminum sites of classical zeolite without the additional effect of the complexing silica. The calcium capacity of 6.0 meq/g is consistent with a classical zeolite at a Si/Al ratio of 1.10–1.15, and is not consistent with the above 7.0 meq/g loadings associated with HZSC's.

The product of this example was found to be a high aluminum version of Zeolite P and not an HZSC. This was surprising in that the reactants and their ratios, as well as the reaction time and temperature, for this example were identical to that of Example 3, albeit on a larger scale. In a search for differences between the method of preparation of this larger lot with apparently equivalent laboratory scale lots, an inconsistency was noted. In all successful HZSC's preparations water, caustic and silicate had been mixed and brought to crystallization temperature with addition of metakaolin as the last step. The hypothesis was advanced that depolymerization of silicate to form predominantly monomeric silicate units might be a necessary step before overall reaction began and that preparation of the highly alkaline silicate solution before reaction with the aluminum source might be required. With this working hypothesis the following example was conducted.

EXAMPLE 13

An identical mixture to that of Example 12 was prepared but in a different order of addition/reaction. 74.97 pounds of deionized water, 42.7 pounds of 50% NaOH solution and 14.12 pounds of N-brand Sodium silicate were combined and heated under agitation to 72° C. in the same 25-gallon stainless steel reactor of the previous example. After an equilibration period of 30 minutes to allow silicate depolymerization, 20.0 pounds of Luminex brand metakaolin was added and the mixture reacted under vigorous agitation for 8 hours at 72 degrees C. After the reaction period, the product was subsequently washed and filtered on several large pan filters including multiple reslurries and rinses with substantial excess of deionized water.

The powder XRD pattern for this product was that of a highly crystalline material of a gismondine-type structure, consistent with that of Example 12. However, unlike Example 12, the silicon NMR showed a clear shoulder to the main peak at −81 to −85 ppm which is characteristic of an HZSC. Additionally, elemental analysis indicated the characteristic elevated Si/Al ratio (Si/Al=1.20) and sodium levels approaching molar silicon contents (Na/Si=1.01) and the characteristic excess of sodium to aluminum on a molar basis (Na/Al=1.21).

With the NMR indication of occluded silicate, exhaustive calcium exchange was conducted as in Example 12. Analysis of the exhaustively exchanged sample yielded 23.8% CaO, 43.2% $SiO_2$ and 31.4% $Al_2O_3$ on a dry weight basis. Thus, the material contained approximately 7.20 meq/g Si, 6.16 meq/g Al and 8.49 meq/g Ca. The Ca/Al meq/g ratio approaching 1.4 is consistent with that of an HZSC and not consistent with that of a zeolite which is limited to 1.0 as noted in Example 12. The calcium capacity approaching 8.5 meq/g is consistent with an HZSC and inconsistent with the 7.0 meq/g theoretical limit noted for zeolites.

The product of this example was found to be an HZSC and not merely a high aluminum version of Zeolite P as prepared in Example 12 in spite of the fact that both were prepared using identical reactants, reaction times and temperatures and crystallization/washing equipment. It is therefore apparent that the order of reactant addition and probably full depolymerization of silicate are imperative in the formation of HZSC.

EXAMPLE 14

In an attempt to demonstrate that aluminum sources other than metakaolin may be employed in the formation of HZSC, an aluminosilicate gel with gross composition approaching a 1:1 Si/Al was prepared by dissolving 2.95 kg of $NaAlO_2$ in 14.0 kg deionized water. To this was added 7.45 kg N-Brand® sodium silicate. The resultant gel was beaten to a homogeneous appearing consistency utilizing a high shear blade. The homogenized gel was poured into stainless steel pans and dried in an oven overnight at 100 degrees C. A portion of this dried gel was pulverized and employed as an HZSC reactant. 89 grams of NaOH and 88 grams of N-Brand® sodium silicate were dissolved in 600 grams of deionized water and brought to a temperature of 72 degrees C. under agitation. After equilibrating, 160 grams of the dried gel aluminosilicate reactant was added to the mixture under agitation and crystallized at 72 degrees C. for 5.5 hours. The sample was washed and vacuum filtered with an excess of deionized water and dried at 100 degrees C. overnight. The XRD powder pattern for this material was that of a highly crystalline gismondine-type structure consistent with that of the previous example. The silicon NMR spectrum showed a clear shoulder to the main peak at −81 to −85 ppm, characteristic of HZSC.

The HZSC material produced in accordance with this example was tested in accordance with the procedure set forth in Example 7.

The results obtained indicated that the material obtained by this example possessed the same rapid removal i.e. 48% in 15 seconds and 82% in 15 minutes as is possessed by the novel material of Example 3.

Thus, this example establishes that aluminum sources other than metakaolin may be employed in the synthesis of the novel silicate zeolite hybrid materials of this invention.

The Examples demonstrate the preparation of a new class of materials denoted HZSC for Hybrid Zeolite-Silica Compositions which demonstrate remarkable speed and thoroughness of multivalent cation complexation. This is especially useful in water softening/detergent building applications. These properties appear to derive from the ability of zeolite cages to entrain and stabilize active, small, highly charged silicate species. The zeolite framework and entrained silicate units act in concert as a new type of hybrid composition showing properties that neither zeolites, silicates nor physical blends of the two demonstrate. This technology is undoubtedly expandable to both other zeolite basestocks and complexation processes beyond water softening.

In order to further demonstrate that the $^{29}Si$ NMR peaks at about −81 to −85 ppm are due to the occluded silicate species present in the novel compositions of this invention, samples of 2 MAP products marketed by Crosfield under the tradenames Zeocros 180 and Doucil A-24 were obtained and tested as received. XRD powder patterns for both samples indicated measurable hydroxysodalite as evidenced by peaks at 14.0, 24.3 and 25.1 degrees 2 theta, FIGS. 4a, b. A sample of high aluminum zeolite P was made in accordance with the method of Haden (U. S. Pat. No. 3,112,176). This sample was found to contain no discernable sodalite as determined by XRD. Representative samples of HZSC, including those of Examples 3 and 13, were examined by XRD and in no case was measurable sodalite present.

The pure MAP as prepared by the Haden method was then subjected to $^{29}Si$ NMR analysis. It was free of the shoulder at −81 to −85 ppm characteristic of HZSC, FIG. 5a.

In a publication by Carr, S. W., Gore, B. and Anderson, M. W., Chem Mater. 1997, Vol. 9, pgs. 1927–1932, it has been noted that as-received Crosfield MAPs contain an NMR shoulder near that characteristic of HZSC. With no such shoulder present in the pure MAP of Haden, an alternative explanation to Carr et al's claim of the shoulder being due to surface hydroxyl groups was sought.

A sample of hydroxysodalite was obtained and found to have 1 large NMR peak centered at about −85.0 ppm. Published values for sodalite vary from about −83.5 to −85 ppm, with the variation largely due to the exact degree of hydration (see *High Resolution Solid State NMR of Silicates and Zeolites*, G. Engelhardt and D. Michel, John Wiley & Sons. Chichester. 1987). This hydroxysodalite was added at a 1% level to the pure MAP and resulted in an XRD pattern, FIG. 4c, essentially identical to the sodalite-contaminated MAP of the commercial Crosfield products, FIGS. 4a, b. This mixture was subjected to $^{29}Si$ NMR analysis and contrasted to the pure MAP of Haden, sodalite contaminated Crosfield MAP, and HZSC of Example 3. Pure MAP has no shoulder in the region of −83 ppm, noted by Carr et al., (see FIG. 5a). Addition of 1% sodalite yielded a spectrum, FIG. 5c, with the shoulder essentially identical (although weaker) to that of the sodalite-contaminated Crosfield product, FIG. 5d. Thus, it is established that the most reasonable explanation for Carr et al's observations is sodalite contamination in the as-received Crosfield MAPs. HZSC is free of these contaminants and yet still contains the characteristic NMR shoulder. It is most reasonable to assign this shoulder to occluded silicates which are also expected in this regime as no sodalite is present.

Detergent compositions incorporating the HZSC materials of the present invention typically contain as essential components from about 0.5% to about 98% of a surfactant and from about 2% to about 99.5% of detergency builders including HZSC of the present invention.

Typical laundry detergent compositions within the scope of the present invention contain from about 5% to about 30% of a surfactant and from about 5% to about 80% total detergency builder including HZSC. Of this builder component from about 20% to 100% by weight of builder component can be the HZSC of the present invention with the balance of the builder component being optional known builders.

Detergent compositions herein may also contain from about 5% to 95% by weight of a wide variety of additional optional components. Such optional components can include, for example, additional detergent builders, chelating agents, enzymes, fabric whiteners and brighteners, sudsing control agents, solvents, hydrotropes, bleaching agents, bleach precursors, buffering agents, soil removal/ anti-redeposition agents, soil release agents, fabric softening agents, perfumes, colorants and opacifiers. A number of these additional optional components are hereinafter described in greater detail.

The detergent compositions of this invention can be prepared in various solid physical forms.

The detergent compositions of this invention are particularly suitable for laundry use.

In a laundry method using the detergent composition of this invention, typical laundry wash water solutions comprise from about 0.1% to about 1% by weight of the HZSC builders of this invention.

The HZSC materials herein may also be employed as builders in laundry additive compositions. Laundry additive compositions of the present invention contain as essential components from about 2% to about 99.5% of the HZSC and further contains from about 0.5% to 98% by weight of a laundry adjuvant selected from the group consisting of surfactants, alternate builders, enzymes, fabric whiteners and brighteners, sudsing control agents, solvents, hydrotropes, bleaching agents, bleach precursors, buffering agents, soil removal/antideposition agents, soil release agents, fabric softening agents, perfumes, colorants, opacifiers and mixtures of these adjuvants. Such adjuvants, whether used in the detergent or laundry additive compositions herein, perform their expected functions in such compositions. A number of these adjuvants are described in greater detail as follows:

Surfactants

Various types of surfactants can be used in the detergent or laundry additive compositions of this invention. Useful surfactants include anionic, nonionic, ampholytic, zwitterionic and cationic surfactants or mixtures of such materials. Detergent compositions for laundry use typically contain from about 5% to about 30% anionic surfactants, mixtures of anionic and non-ionic surfactants or cationic surfactants.

The various classes of surfactants useful in the detergent and laundry additive compositions herein are exemplified as follows:

This class of surfactants includes alkali metal monocarboxylates (soaps) such as the sodium, potassium, ammonium and alkylolammonium salts of higher fatty acids containing from about 8 to about 24 carbon atoms and preferably from about 12 to about 18 carbon atoms. Suitable fatty acids can be obtained from natural sources such as, for instance, from plant or animal esters (e.g., palm oil, coconut oil, babassu oil, soybean oil, castor oil, tallow, whale and fish oils, grease, lard, and mixtures thereof). The fatty acids also can be synthetically prepared (e.g., by the oxidation of petroleum, or by hydrogenation of carbon monoxide by the Fischer-Tropsch process). Resin acids are suitable such as rosin and those resin acids in tall oil. Naphthenic acids are also suitable. Sodium and potassium soaps can be made by direct saponification of the fats and oils or by the neutralization of the free fatty acids which are prepared in a separate manufacturing process. Particularly useful are the sodium and potassium salts of the mixtures of fatty acids derived from coconut oil and tallow, i.e., sodium or potassium tallow and coconut soap. Soaps and fatty acids also act as detergency builders in detergent compositions because they remove multivalent ions by precipitation.

Anionic surfactants also include water-soluble salts, particularly the alkali metal and ethanolamine salts of organic sulfuric reaction products having in their molecular structure an alkyl radical containing from about 8 to about 22 carbon atoms and a sulfonic acid or sulfuric acid ester radical. (Included in the term alkyl is the alkyl portion of alkylaryl radicals). Examples of this group of non-soap anionic surfactants are the alkyl sulfates, especially those obtained by sulfating the higher alcohols ($C_8$–$C_{18}$ carbon atoms); alkyl benzene sulfonates, in which the alkyl group contains from about 9 to about 15 carbon atoms, in straight chain or branched chain configuration, sodium alkyl glyceryl ether sulfonates; fatty acid monoglyceride sulfonates and sulfates; sulfuric acid esters of the reaction product of one mole of a $C_{12-18}$ alcohol and about 1 to 6 moles of ethylene oxide and salts of alkyl phenol ethylene oxide ether sulfate with about 1 to about 10 units of ethylene oxide per molecule and in which the alkyl radicals contain about 8 to about 12 carbon atoms.

Additional examples of non-soap anionic surfactants are the reaction products of fatty acids esterified with isethionic acid and neutralized with sodium hydroxide where, for example, the fatty acids are derived from coconut oil and sodium or potassium salts of fatty acid amide of methyl lauride in which the fatty acids, for example are derived from coconut oil.

Still other anionic surfactants include the class designated as succinamates. This class includes such surface active agents as disodium N-octadecylsulfosuccinamate; tetrasodium N-(1,2-dicarboxyethyl)-N-octadecylsulfosuccinamate; the diamyl ester of sodium sulfosuccinic acid; the dihexyl ester of sodium sulfosuccinic acid and the dioctyl ester of sodium sulfosuccinic acid.

Anionic phosphate surfactants are also useful in the detergent or laundry additive compositions of the present invention. These are surface active materials having substantial detergent capability in which the anionic solubilizing group connecting hydrophobic moieties is an oxy acid of phosphorus. The more common solubilizing groups are —$SO_4H$, —$SO_3H$, and —$CO_2H$. Alkyl phosphate esters such as (R—O)$_2$PO$_2$H and ROPO$_3$H$_2$ in which R represents an alkyl chain containing from about 8 to about 20 carbon atoms are useful.

These esters can be modified by including in the molecule from one to about 40 alkylene oxide units, e.g., ethylene oxide units.

Particularly useful anionic surfactants for incorporation into the compositions herein are alkyl ether sulfates. The alkyl ether sulfates are condensation products of ethylene oxide and monohydric alcohols having about 10 to about 20 carbon atoms. Preferably, R has 12 to 18 carbon atoms. The alcohols can be derived from fats, e.g., coconut oil or tallow, or can be synthetic. Such alcohols are reacted with 0.5 to 30, and especially 1 to 6, molar proportions of ethylene oxide and the resulting mixture of molecular species, having, for example, an average of 3 to 6 moles of ethylene oxide per mole of alcohol, is sulfated and neutralized.

Other suitable anionic surfactants are olefin and paraffin sulfonates having from about 12 to about 24 carbon atoms.

Alkoxylated nonionic surfactants may be broadly defined as compounds produced by the condensation of alkylene oxide groups (hydrophilic in nature) with an organic hydrophobic compound, which may be aliphatic or alkyl aromatic in nature. The length of the hydrophilic or polyoxyalkylene radical which is condensed with any particular hydrophobic group can be readily adjusted to yield a water-soluble compound having the desired degree of balance between hydrophilic and hydrophobic elements.

Alkoxylated nonionic surfactants include:

(1) The condensation product of aliphatic alcohols having from 8 to 22 carbon atoms, in either straight chain or branched chain configuration, with from about 5 to about 20 moles of ethylene oxide per mole of alcohol.

(2) The polyethylene oxide condensates of alkyl phenols, e.g., the condensation products of alkyl phenols having an alkyl group containing from about 6 to 12 carbon atoms in either a straight chain or branched chain configuration, with ethylene oxide, the ethylene oxide being present in amounts of from about 5 to about 25 moles of ethylene oxide per mole of alkyl phenol. The alkyl substituent in such compounds may be derived from polymerized propylene, diisobutylene, octene, or nonene, for example.

(3) Materials derived from the condensation of ethylene oxide with a product resulting from the reaction of propylene oxide and a compound with reactive hydrogen such as glycols and amines such as, for example, compounds containing from about 40% to about 80% polyoxyethylene by weight resulting from the reaction of ethylene oxide with a hydrophobic base constituted of the reaction product of ethylene diamine and propylene oxide.

Non-polar nonionic surfactants include the amine oxides and corresponding phosphine oxides. Useful amine oxide surfactants include those having the formula $R^1R^2R^3N \rightarrow O$ wherein $R^1$ is an alkyl group containing from about 10 to about 28 carbon atoms, from 0 to about 2 hydroxy groups and from 0 to about 5 ether linkages, there being at least one moiety of $R^1$ which is an alkyl group containing from about 10 to about 18 carbon atoms and $R^2$ and $R^3$ are selected from the group consisting of alkyl radicals and hydroxyalkyl radicals containing from 1 to about 3 carbon atoms.

Specific examples of amine oxide surfactants include: dimethyldodecylamine oxide, dimethyltetradecylamine oxide, ethylmethyltetradecylamine oxide, cetyldimethylamine oxide, diethyltetradecylamine oxide, dipropyldodecylamine oxide bis-(2-hydroxyethyl)-dodecylamine oxide, bis-(2-hydroxypropyl) methyltetradecylamine oxide, dimethyl-(2-hydroxydodecyl)amine oxide, and the corresponding decyl, hexadecyl and octadecyl homologs of the above compounds.

Additional nonionic surfactants include alkyl glucosides and alkylamides.

Zwitterionic surfactants include derivatives of aliphatic quaternary ammonium, phosphonium, and sulfonium compounds in which the aliphatic moiety can be straight or branched chain and wherein one of the aliphatic substituents contains from about 8 to 24 carbon atoms and one contains an anionic water-solubilizing group. Particularly preferred zwitterionic materials are the ethoxylated ammonium sulfonates and sulfates. Ammonioamidates are also useful zwitterionic surfactants.

Ampholytic surfactants include derivatives of aliphatic-heterocyclic secondary and tertiary amines in which the aliphatic moiety can be straight chain or branched and wherein one of the aliphatic substituents contains from about 8 to about 24 carbon atoms and at least one aliphatic substituent contains an anionic water-solubilizing group.

Cationic surfactants comprise a wide variety of compounds characterized by one or more organic hydrophobic groups in the cation and generally by a quaternary nitrogen associated with an acid radical. Pentavalent nitrogen ring compounds are also considered quaternary nitrogen compounds. Suitable anions are halides, methylsulfate and hydroxide. Tertiary amines can have characteristics similar to cationic surfactants at washing solutions pH values less than about 8.5.

When cationic surfactants are used in combination with anionic surfactants and certain detergency builders including polycarboxylates, compatibility must be considered. A type of cationic surfactant generally compatible with anionic surfactants and polycarboxylates is a $C_{8-18}$ alkyl tri $C_{1-3}$ alkyl ammonium chloride or methyl sulfate.

The detergent and laundry additive compositions of the present invention optionally can contain detergency builders in addition to HZSC material.

Ether carboxylate compounds or mixtures described in U.S. Pat. No. 4,663,071 are useful. Suitable polycarboxylate detergency builders include the acid form and alkali metal, ammonium and substituted ammonium salts of citric, ascorbic, phytic, mellitic, benzene pentacarboxylic, oxydiacetic, carboxymethyl-oxysuccinic, carboxymethyloxymalonic, cis-cyclohexanehexacarboxylic, cis-cyclopentanetetracarboxylic and oxydisuccinic acids. Also suitable are polycarboxylate polymers and copolymers. Particularly suitable are acrylic acid polymers and salts thereof and copolymers of acrylic and maleic acids and salts thereof which act as dispersants of particulate materials in wash solutions.

The polyacetal carboxylates can be incorporated in the detergent and laundry additive compositions of the invention.

Also suitable in the detergent and laundry additive compositions of the invention are the 3,3-dicarboxy-4-oxa-1,6-hexanedioates and the related compounds.

Suitable ether polycarboxylates also include cyclic compounds, particularly alicyclic compounds.

Polyphosphonate detergency builders comprise a large range of organic compounds having two or more wherein M is hydrogen or a salt-forming radical. Suitable phosphonates include ethane-1-hydroxy-1,1-diphosphonates, ethanehydroxy-1,1,2-triphosphonates and their oligomeric ester chain condensates. Suitable polyphosphonates for use in the compositions of the invention also include nitrogen-containing polyphosphonates such as ethylenediaminetetrakis (methylene-phosphonic) acid and diethylenetriaminepentakis (methylene-phosphonic) acid and alkali metal, ammonium and substituted ammonium salts thereof. In common with other phosphorus-containing components, the incorporation of phosphonates may be restricted or prohibited by government regulation.

$C_{8-24}$ alkyl monocarboxylic acid and soluble salts thereof have a detergent builder function in addition to surfactant characteristics. $C_8$–$C_{24}$ alkyl, alkenyl, alkoxy and thio-substituted alkyl dicarboxylic acid compounds, such as 4-pentadecene-1,2-dicarboxylic acid, salts thereof and mixtures thereof, are also useful optional detergency builders.

Inorganic detergency builders useful in the detergent and laundry additive compositions of this invention at total combined levels of from 0% to about 75% by weight, include alkali metal phosphates, sodium aluminosilicates, including HZSC, alkali metal silicates and alkali metal carbonates.

Phosphate detergency builders include alkali metal orthophosphates which remove multivalent metal cations from laundry solutions by precipitation and the polyphosphates such as pyrophosphates, tripolyphosphates and water-soluble metaphosphates that sequester multivalent metal cations in the form of soluble complex salts or insoluble precipitating complexes. Sodium pyrophosphate and sodium tripolyphosphate are particularly suitable in granular detergent and laundry additive compositions to the extent that governmental regulations do not restrict or prohibit the use of phosphorus-containing compounds in such compositions. Granular detergent and laundry additive composition embodiments of the invention particularly adapted for use in areas where the incorporation of phoshorus-containing compounds is restricted contains low total phosphorus and, preferably, essentially no phosphorus.

Other optional builder material include aluminosilicate ion exchange materials, other than HZSC, e.g., crystalline zeolites, other than HZSC, and amorphous aluminosilicates.

Examples are available under the designation Zeolite A, Zeolite B (also referred to as Zeolite P), conventional MAP, and Zeolite X.

Other optional builders include alkali metal silicates. Suitable alkali metal silicates have a mole ratio of $SiO_2$ alkali metal oxide in the range of from about 1:1 to about 4:1. The alkali metal silicate suitable herein include commercial preparations of the combination of silicon dioxide and alkali metal oxide or carbonate fused together in varying proportions according to, for example, the following reaction:

$$mSiO_2 + Na_2CO_3 \xrightarrow{2600° F.} mSiO_2:Na_2O + CO_2$$

The value of m, designating the molar ratio of $SiO_2$:—$Na_2O$, ranges from about 0.5 to about 4 depending on the proposed use of the sodium silicate. The term "alkali metal silicate" as used herein refers to silicate solids with any ratio of $SiO_2$ to alkali metal oxide. Silicate solids normally possess a high alkalinity content; in addition water of hydration is frequently present as, for example, in metasilicates which can exist having 5, 6, or 9 molecules of water. Sodium silicate solids with a $SiO_2:Na_2O$ mole ratio of from about 1.5 to about 3.5, are preferred in granular laundry detergent compositions.

Silicate solids are frequently added to granular detergent or laundry additive compositions as corrosion inhibitors to provide protection to the metal parts of the washing machine in which the detergent or laundry additive composition is utilized. Silicates have also been used to provide a degree of crispness and pourability to detergent or laundry additive granules which is very desirable to avoid lumping and caking.

Alkali metal carbonates are useful in the granular detergent or laundry additive compositions of the invention as a source of washing solution alkalinity and because of the ability of the carbonate ion to remove calcium and magnesium ions from washing solutions by precipitation.

Preferred granular compositions free of inorganic phosphates contain from about 8% to about 40% by weight sodium carbonate, from 0% to about 30% HZSC, from about 0.5% to about 10% sodium silicate solids, from about 5% to about 35% of the novel ether carboxylate compounds of this invention and from about 10% to about 25% surfactant.

Additional Optional Components

Granular detergent or laundry additive compositions of this invention can contain materials such as sulfates, borates, perborates organic peroxy acid salts, peroxy bleach precursors and activators and water of hydration.

Laundry additive compositions of this invention can contain water and other solvents. Low molecular weight pisopropanol are suitable. Monohydric alcohols are preferred for solubilizing the surfactant but polyols containing from 2 to about 6 carbon atoms and from 2 to about 6 hydroxy groups can be used and can provide improved enzyme stability. Examples of polyols include propylene glycol, ethylene glycol, glycerine and 1,2-propanediol. Ethanol is a particularly preferred alcohol.

The detergent or laundry additive compositions of the invention can also contain such materials as proteolytic and amylolytic enzymes, fabric whiteners and optical brighteners, sudsing control agents, hydrotropes such as sodium toluene, xylene or cumene sulfonate, perfumes, colorants, opacifiers, anti-redeposition agents and alkalinity control or buffering agents such as monoethanolamine and triethanolamine. The use of these materials is known in the detergent art.

Materials that provide clay soil removal/anti-redeposition benefits can also be incorporated in the detergent and laundry additive compositions of the invention. These clay soil removal/anti-redeposition agents are usually included at levels of from about 0.1% to about 10% by weight of the composition.

One group of preferred clay soil removal/anti-redeposition agents are the ethoxylated amines. Another group of preferred clay soil removal/anti-redeposition agents are cationic compounds. Other clay soil removal/anti-redeposition agents which can be used include the ethoxylated amine polymers. Polyethylene glycol can also be incorporated to provide anti-redeposition and other benefits.

Soil release agents, such as disclosed in the art to reduce oily staining of polyester fabrics, are also useful in the detergent and laundry additive compositions of the present invention. Examples are copolymers of ethylene terephthalate and polyethylene oxide terephthalate as soil release agents. Cellulose ether soil release agents and block polyester compounds are also useful as soil release agents in detergent and laundry additive compositions.

The detergent and laundry additive compositions herein may also optionally contain one or more iron and magnesium chelating agents. Such chelating agents can be selected from the group consisting of amino carboxylates, amino phosphonates, polyfunctionally-substituted aromatic chelating agents and mixtures thereof, all as hereinafter defined.

Amino carboxylates useful as optional chelating agents in compositions of the invention include ethylenediaminetetraacetates, N-hydroxyethylethylenediaminetriacetates, nitrilotriacetates, ethylenediamine tetrapropionates, diethylenetriaminepentaacetates, and ethanoldiglycines.

Amino phosphonates are also suitable for use as chelating agents in the compositions of the invention when at least low levels of total phosphorus are permitted in detergent compositions. Compounds include ethylenediaminetetrakis (methylenephosphonates), nitrilotris (methylenephosphonates) and diethylenetriaminepentakis (methylenephosphonates). Preferably, these amino phosphonates do not contain alkyl or alkenyl groups with more than about 6 carbon atoms. Alkylene groups can be shared by substructures.

Polyfunctionally-substituted aromatic chelating agents are also useful in the compositions herein. Preferred compounds of this type in acid form are dihydroxydisulfobenzenes and 1,2-dihydroxy-3,5-disulfobenzene or other disulfonated catechols in particular. Alkaline detergent compositions can contain these materials in the form of alkali metal, ammonium or substituted ammonium (e.g., mono- or triethanolamine) salts.

If utilized, optional chelating agents will generally comprise from about 0.1% to 10% by weight of the detergent or laundry additive compositions herein. More preferably chelating agents will comprise from about 0.75% to 3% by weight of such compositions.

The detergent and laundry additive compositions of this invention can also include a bleach system comprising an inorganic or organic peroxy bleaching agent and, in preferred compositions, an organic peroxy acid bleach precursor. Suitable inorganic peroxygen bleaches include sodium perborate mono- and tetrahydrate, sodium percarbonate, sodium persilicate and urea-hydrogen peroxide addition products and the clathrate $4Na_2SO_4 \cdot 2H_2O_2 \cdot 1NaCl$. Suitable organic bleaches include peroxylauric acid, peroxyoctanoic acid, peroxynonanoic acid, peroxydecanoic acid, diperoxydodecanedioic acid, diperoxyazelaic acid, mono- and diperoxyphthalic acid and mono- and diperoxyisophthalic acid. The bleaching agent is generally present in the detergent and laundry additive compositions of this invention at a level of from about 5% to about 50% preferably from about 10% to about 25% by weight.

The detergent and laundry additive compositions of the invention may also contain an organic peroxy acid bleach precursor at a level of from about 0.5% to about 10%, preferably from about 1% to about 6% by weight. Suitable bleach precursors include for example, the peracetic acid bleach precursors such as tetraacetylethylenediamine, tetraacetylmethylenediamine, tetraacetylhexylenediamine, sodium p-acetoxybenzene sulfonate, tetraacetylglycouril, pentaacetylglucose, octaacetyllactose, and methyl o-acetoxy benzoate. The alkyl group, R, can be either linear or branched and, in preferred embodiments, it contains from 7 to 9 carbon atoms.

The bleach precursor (activator) herein will normally be added in the form of particles comprising finely divided bleach activator and a binder. The binder generally selected from nonionic surfactants such as ethoxylated tallow alcohols, polyethylene glycols, onic surfactants, film forming polymers, fatty acids mixtures thereof. Highly preferred are nonionic surfactant binders, the bleach activator being admixed with the binder and extruded in the form of elongated particles through a radial extruder. Alternatively, the bleach activator particles can be prepared by spray drying.

In addition to their utility as builders in detergent laundry additive compositions, the novel hybrid zeolites composition of the invention ether may also be utilized in other contexts wherein water hardness sequestration is required. Thus, for example, the HZSC compositions herein may be employed in water softener compositions, devices and methods. These materials also useful in boiler descaling compositions and methods.

What is claimed is:

1. A hybrid composition comprising crystalline zeolitic aluminosilicate and occluded silicate, said hybrid composition being characterized by a capacity to sequester calcium in excess of the amount of charge inducing aluminum in the crystals of said zeolitic aluminosilicate.

2. The composition of claim 1, wherein said capacity to sequester calcium is in excess of the theoretical limit possible for said zeolitic aluminosilicate.

3. A crystalline aluminosilicate zeolitic molecular sieve composition having the x-ray powder diffraction pattern of a zeolitic molecular sieve having a $SiO_2/Al_2O_3$ molar ratio in the range of 2 to 3 and containing occluded silicate in addition to the silica in the framework of said zeolitic molecular sieve, said occluded silicate being detectable by $^{29}Si$ NMR, the characteristic $^{29}Si$ NMR peak being at or about −81 to −85 ppm.

4. A synthetic zeolitic aluminosilicate molecular sieve composition comprising a molecular sieve having a $SiO_2/Al_2O_3$ ratio below 3 and occluded silicate, said occluded silicate exhibiting a $^{29}Si$ NMR peak at or about −81 to −85 ppm, said molecular sieve having been prepared by adding a source of aluminum to a high silica content sodium silicate solution which is at a pH greater than 12, and which has been aged for at least 30 minutes at a temperature from 30 to 85° C., heating the resulting mixture until molecular sieve crystals form, followed by washing with water to remove soluble sodium and silica from said crystals.

5. The synthetic zeolitic aluminosilicate molecular sieve of claim 4, which is selected from the group consisting of B type, A type, faujasite type and chabazite type and mixtures thereof.

6. The synthetic zeolitic aluminosilicate molecular sieve composition in accordance with claim 5 wherein the aluminum source is metakaolin.

7. The synthetic aluminosilicate molecular sieve composition in accordance with claim 5 wherein the alumina source is an aluminosilicate gel.

8. The molecular sieve composition of claim 5 which contains from about 5 to 40% by weight of the silica present as occluded silicate deposited during said reaction.

9. A crystalline zeolitic molecular sieve composition having the x-ray pattern of type B zeolite crystals and containing from 5 to 40% by weight of the silica present as occluded silicate detectable by $^{29}Si$ NMR in addition to the $SiO_2$ in the framework of said type B crystals.

10. A crystalline zeolitic molecular sieve composition having the x-ray pattern of zeolite A crystals and containing from 5 to 40% by weight of the silica present as occluded silicate detectable by $^{29}Si$ NMR in addition to the $SiO_2$ in the framework of said type A crystals.

11. A crystalline zeolitic molecular sieve composite having the x-ray pattern of faujasite and containing from 5 to 40% by weight of the silica present as occluded silicate detectable by $^{29}Si$ NMR in addition to the $SiO_2$ in the framework of said faujasite crystals.

12. A crystalline zeolitic molecular sieve composite having the x-ray pattern of chabazite and containing from 5 to 40% by weight of the silica present as occluded silica detectable by $^{29}Si$ NMR in addition to the $SiO_2$ in the framework of said chabazite crystals.

13. Mixtures of high aluminum content zeolitic molecular sieve crystals and occluded silicate, said mixtures having the molar formula:

$$1.25 \pm 0.20 \; Na_2O{:}1.00 \; Al_2O_3{:}xSiO_2{:}yH_2O$$

wherein x is 2.10 to 2.90;

and from 5 to 40% of the $SiO_2$ by weight of x is non-zeolitic occluded silicate detectable by $^{29}Si$ NMR and y is 0–20.

\* \* \* \* \*